United States Patent
Ishii et al.

(10) Patent No.: US 6,375,922 B1
(45) Date of Patent: Apr. 23, 2002

(54) PROCESS FOR PRODUCING HYDROGEN PEROXIDE

(75) Inventors: Yasutaka Ishii, Takatsuki; Tatsuya Nakano, Himeji, both of (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/647,881

(22) PCT Filed: Feb. 1, 2000

(86) PCT No.: PCT/JP00/00528

§ 371 Date: Oct. 6, 2000

§ 102(e) Date: Oct. 6, 2000

(87) PCT Pub. No.: WO00/46145

PCT Pub. Date: Aug. 10, 2000

(30) Foreign Application Priority Data

Feb. 8, 1999 (JP) .......................................... 11-029562

(51) Int. Cl.$^7$ .......................................... C01B 15/026
(52) U.S. Cl. ............................................... 423/591
(58) Field of Search ............................... 423/584, 587, 423/591

(56) References Cited

U.S. PATENT DOCUMENTS

| | | | | |
|---|---|---|---|---|
| 2,871,101 A | * | 1/1959 | Rust et al. | 423/591 |
| 2,871,102 A | * | 1/1959 | Rust et al. | 423/591 |
| 2,871,103 A | * | 1/1959 | Skinner et al. | 423/591 |
| 3,003,853 A | * | 10/1961 | Mecorney et al. | 423/591 |
| 5,194,067 A | | 3/1993 | Albal et al. | 23/373 R |
| 5,552,131 A | * | 9/1996 | Jubin, Jr. | 423/584 |
| 5,968,472 A | | 10/1999 | Oyague et al. | 423/591 |

FOREIGN PATENT DOCUMENTS

JP  8-295897  11/1996  ........... C11D/3/395

* cited by examiner

Primary Examiner—Wayne Langel
Assistant Examiner—Maribel Medina
(74) Attorney, Agent, or Firm—Birch, Stewart, Kolasch & Birch, LLP

(57) ABSTRACT

The invented process produces hydrogen peroxide by reacting a primary or secondary alcohol with oxygen in the presence of an imide compound of the following formula (1):

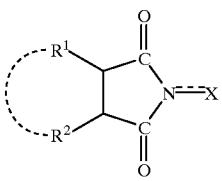

(1)

wherein each of $R^1$ and $R^2$ is, identical to or different from each other, a hydrogen atom, a halogen atom, an alkyl group, an aryl group, a cycloalkyl group, a hydroxyl group, an alkoxy group, a carboxyl group, an alkoxycarbonyl group, or an acyl group, where $R^1$ and $R^2$ may be combined to form a double bond, or an aromatic or non-aromatic ring; X is an oxygen atom or a hydroxyl group, where one or two N-substituted cyclic imido groups indicated in the formula (1) may be further bonded to the $R^1$, $R^2$, or to the double, bond or aromatic or non-aromatic ring formed together by $R^1$ and $R^2$, to yield hydrogen peroxide. According to the process, hydrogen peroxide can be easily and efficiently obtained from readily available materials.

3 Claims, No Drawings

PROCESS FOR PRODUCING HYDROGEN PEROXIDE

This application is the national phase under 35 U.S.C. § 371 of PCT International Application No. PCT/JP00/00528 which has an International filing date of Feb. 1, 2000, which designated the United States of America.

TECHNICAL FIELD

The present invention relates to a process for producing hydrogen peroxide which is useful as, for example, oxidizing agents, bleaching agents, disinfectants, and bactericides or fungicides.

BACKGROUND ART

As processes for the commercial production of hydrogen peroxide, (i) a process of reacting sulfuric acid with ammonia to yield an ammonium hydrogensulfate solution, adding an electrolysis accelerator to the solution to subject the solution to electrolysis and anodic oxidation to thereby form ammonium peroxodisulfate, adding sulfuric acid to ammonium peroxodisulfate to yield hydrogen peroxide, and distilling hydrogen peroxide in vacuo, and (ii) a process of utilizing autoxidation of 2-ethylanthraquinol or another anthraquinol compound to yield hydrogen peroxide are known. The former process, however, has complicated steps and costs dearly, and the latter process requires materials which are not so readily available.

DISCLOSURE OF INVENTION

Accordingly, it is an object of the present invention to provide a process capable of easily and efficiently obtaining hydrogen peroxide from readily available materials.

After intensive investigations to achieve the above object, the present inventors found that the oxidation of a primary or secondary alcohol with oxygen using an imide compound having a specific structure can efficiently yield hydrogen peroxide. The invention has been accomplished on the basis of the above finding.

Specifically, the invention provides a process for producing hydrogen peroxide, which process includes the step of reacting a primary or secondary alcohol with oxygen in the presence of an imide compound of the following formula (1):

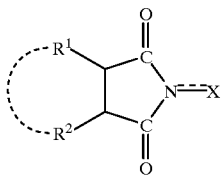

(1)

wherein each of $R^1$ and $R^2$ s identical to or different from each other, a hydrogen atom, a halogen atom, an alkyl group, an aryl group, a cycloalkyl group, a hydroxyl group, an alkoxy group, a carboxyl group, an alkoxycarbonyl group, or an acyl group, where $R^1$ and $R^2$ may be combined to form a double bond, or an aromatic or non-aromatic ring; X is an oxygen atom or a hydroxyl group; where one or two N-substituted cyclic imido groups indicated in the formula (1) may be further bonded to the aforementioned $R^1$, $R^2$, or to the double bond or aromatic or non-aromatic ring formed together by $R^1$ and $R^2$, to yield hydrogen peroxide.

The primary or secondary alcohol(s) maybe simply referred to as "substrate(s)" in the present specification.

BEST MODE FOR CARRYING OUT THE INVENTION

[Substrate]

The primary or secondary alcohols include a wide variety of alcohols inclusive of monohydric, dihydric, and polyhydric alcohols. Each of the primary or secondary alcohols may have a substituent. Such substituents include, but are not limited to, halogen atoms, an oxo group, a hydroxyl group, a mercapto group, substituted oxy groups (e.g., alkoxy groups, aryloxy groups, and acyloxy groups), substituted thio groups, a carboxyl group, substituted oxycarbonyl groups, substituted or unsubstituted carbamoyl groups, a cyano group, a nitro group, substituted or unsubstituted amino groups, alkyl groups, alkenyl groups, alkynyl groups, cycloalkyl groups, cycloalkenyl groups, aryl groups (e.g., phenyl and naphthyl groups), aralkyl groups, and heterocyclic groups.

The primary alcohols include, but are not limited to, methanol, ethanol, 1-propanol, 1-butanol, 2-methyl-1-propanol, 1-pentanol, 1-hexanol, 1-octanol, 1-decanol, 1-hexadecanol, and other saturated or unsaturated aliphatic primary alcohols each having about 1 to 30 (preferably 1 to 20, and more preferably 1 to 15) carbon atoms; cyclopentylmethyl alcohol, cyclohexylmethyl alcohol, 2-cyclohexylethyl alcohol, and other saturated or unsaturated alicyclic primary alcohols; benzyl alcohol, 2-phenylethyl alcohol, 3-phenylpropyl alcohol, and other aromatic primary alcohols; and 2-hydroxymethylpyridine, and other heterocyclic primary alcohols. Preferred primary alcohols include saturated aliphatic primary alcohols each having about 1 to 20 carbon atoms, and other aliphatic primary alcohols.

Examples of the secondary alcohols include 2-propanol, s-butyl alcohol, 2-pentanol, 3-pentanol, 2-hexanol, 2-octanol, 4-decanol, 2-hexadecanol, and other saturated or unsaturated aliphatic secondary alcohols each having about 3 to 30 (preferably 3 to 20, and more preferably 3 to 15) carbon atoms; cyclobutanol, cyclopentanol, cyclohexanol, cyclooctanol, cyclododecanol, cyclopentadecanol, and other saturated or unsaturated alicyclic secondary alcohols each having about 3 to 20 (preferably 3 to 15, more preferably 5 to 15, and especially 5 to 8) members; 1-phenylethanol, 1-phenylpropanol, 1-phenylmethylethanol, benzhydrol (diphenylmethanol), 9,10-dihydroanthracene-9,10-diol and other aromatic secondary alcohols; and 1-(2-pyridyl)ethanol, and other heterocyclic secondary alcohols.

Preferred substrates include secondary alcohols such as s-butyl alcohol, 2-octanol, and other aliphatic secondary alcohols, cyclohexanol and other alicyclic secondary alcohols, 1-phenylethanol, benzhydrol, and other aromatic alcohols. Each of the aforementioned alcohols can be used alone or in combination.

[Imide Compound]

The imide compounds of the formula (1) are for use as a catalyst in the invented process. Of the substituents $R^1$ and $R^2$ in the formula (1), the halogen atom includes iodine, bromine, chlorine and fluorine atoms. The alkyl group includes, for example, methyl, ethyl, propyl, isopropyl, butyl, isobutyl, s-butyl, t-butyl, pentyl, hexyl, heptyl, octyl, decyl, and other straight- or branched-chain alkyl groups each having about 1 to 10 carbon atoms. Preferred alkyl groups are alkyl groups each having about 1 to 6 carbon atoms, and are more preferably lower alkyl groups each having about 1 to 4 carbon atoms.

The aryl group includes phenyl, and naphthyl groups, for example; and the illustrative cycloalkyl group includes cyclopentyl, and cyclohexyl groups. As the alkoxy group, there may be mentioned, for example, methoxy, ethoxy, propoxy, isopropoxy, butoxy, isobutoxy, t-butoxy, pentyloxy, hexyloxy, and other alkoxy groups each having about 1 to 10 carbon atoms, preferably about 1 to 6 carbon atoms, of which lower alkoxy groups each having about 1 to 4 carbon atoms are especially preferred.

Examples of the alkoxycarbonyl group include methoxycarbonyl, ethoxycarbonyl, propoxycarbonyl, isopropoxycarbonyl, butoxycarbonyl, isobutoxycarbonyl, t-butoxycarbonyl, pentyloxycarbonyl, hexyloxycarbonyl, and other alkoxycarbonyl groups each having about 1 to 10 carbon atoms in the alkoxy moiety. Preferred alkoxycarbonyl groups are alkoxycarbonyl groups each having about 1 to 6 carbon atoms in the alkoxy moiety, and are especially lower alkoxycarbonyl groups each having about 1 to 4 carbon atoms in the alkoxy moiety.

The illustrative acyl groups include, but are not limited to, formyl, acetyl, propionyl, butyryl, isobutyryl, valeryl, isovaleryl, pivaloyl, and other acyl groups each having about 1 to 6 carbon atoms.

The substituents $R^1$ and $R^2$ maybe identical to, or different from each other. The substituents $R^1$ and $R^2$ in the formula (1) may be combined to form a double bond, or an aromatic or non-aromatic ring. The preferred aromatic or non-aromatic ring is a 5- to 12-membered ring, and especially a 6- to 10-membered ring. The ring may be a heterocyclic ring or condensed heterocyclic ring, but it is often a hydrocarbon ring. Such rings include, for example, non-aromatic alicyclic rings (e.g., cyclohexane ring and other cycloalkane rings which may have a substituent, cyclohexene ring and other cycloalkene rings which may have a substituent), non-aromatic bridged rings (e.g., 5-norbornene ring and other bridged hydrocarbon rings which may have a substituent), benzene ring, naphthalene ring and other aromatic rings (including condensed rings) which may have a substituent. The ring is composed of an aromatic ring in many cases. The ring may have a substituent such as an alkyl group, a haloalkyl group, a hydroxyl group, an alkoxy group, a carboxyl group, an alkoxycarbonyl group, an acyl group, a nitro group, a cyano group, an amino group, or a halogen atom.

In the formula (1), X represents an oxygen atom or a hydroxyl group, and the bond between the nitrogen atom, N, and X is a single bond or a double bond.

To $R^1$, $R^2$, or to the double bond or aromatic or non-aromatic ring formed together by $R^1$ and $R^2$, one or two N-substituted cyclic imido groups indicated in the formula (1) may be further bonded. For example, when $R^1$ or $R^2$ is an alkyl group having two or more carbon atoms, the N-substituted cyclic imido group may be formed together with adjacent two carbon atoms constituting the alkyl group. Likewise, when $R^1$ and $R^2$ are combined to form a double bond, the N-substituted cyclic imido group may be formed together with the double bond. In case that $R^1$ and $R^2$ are combined to form an aromatic or non-aromatic ring, the N-substituted cyclic imido group may be formed with adjacent two carbon atoms constituting the aforementioned ring.

Preferred imide compounds include compounds of the following formulae:

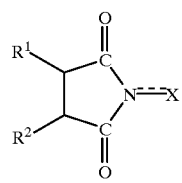

(1a)

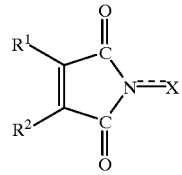

(1b)

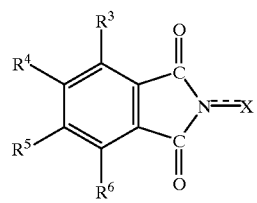

(1c)

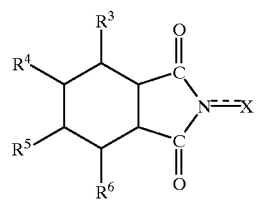

(1d)

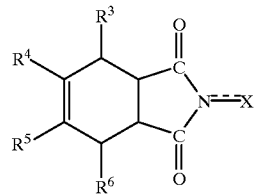

(1e)

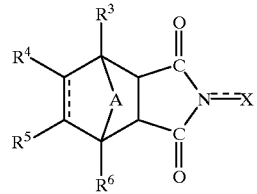

(1f)

wherein $R^3$ to $R^6$ are each, identical to or different from each other, a hydrogen atom, an alkyl group, a haloalkyl group, a hydroxyl group, an alkoxy group, a carboxyl group, an alkoxycarbonyl group, an acyl group, a nitro group, a cyano group, an amino group, or a halogen atom, where, adjacent groups of $R^3$ to $R^6$ may be combined to form an aromatic or non-aromatic ring; in the formula (1f), A represents a methylene group or an oxygen atom, and $R^1$, $R^2$ and X have the same meanings as defined above, where one or two N-substituted cyclic imido groups indicated in the formula (1c) may be further bonded to the benzene ring in the formula (1c).

In the substituents $R^3$ to $R^6$, the alkyl group includes similar alkyl groups to those exemplified above, especially alkyl groups each having about 1 to 6 carbon atoms. The haloalkyl group includes trifluoromethyl group and other haloalkyl groups each having about 1 to 4 carbon atoms, and the alkoxy group includes similar alkoxy groups to those mentioned above, and especially lower alkoxy groups each having about 1 to 4 carbon atoms. The alkoxycarbonyl group includes similar alkoxycarbonyl groups to those described above, particularly lower alkoxycarbonyl groups each having about 1 to 4 carbon atoms in the alkoxy moiety. As the acyl group, there may be mentioned similar acyl groups to those described above, especially acyl groups each having about 1 to 6 carbon atoms, and the illustrative halogen atoms include fluorine, chlorine and bromine atoms. Each of the substituents $R^3$ to $R^6$ is often a hydrogen atom, a lower alkyl group having about 1 to 4 carbon atoms, a carboxyl group, a nitro group, or a halogen atom. The ring formed together by $R^3$ to $R^6$ includes similar rings to the aforementioned rings which are formed together by $R^1$ and $R^2$. Among them, aromatic or non-aromatic 5- to 12-membered rings are particularly preferred.

Illustrative preferred imide compounds include N-hydroxysuccinimide, N-hydroxymaleimide, N-hydroxyhexahydrophthalimide, N,N'-dihydroxycyclohexanetetracarboximide, N-hydroxyphthalimide, N-hydroxytetrabromophthalimide, N-hydroxytetrachlorophthalimide, N-hydroxychlorendimide, N-hydroxyhimimide, N-hydroxytrimellitimide, N,N'-dihydroxypyromellitimide, and N,N'-dihydroxynaphthalenetetracarboximide.

The imide compounds of the formula (1) can be prepared by a conventional imidation process (a process for the formation of an imide), such as a process that comprises the steps of allowing a corresponding acid anhydride to react with hydroxylamine $NH_2OH$ for ring-opening of an acid anhydride group, and closing the ring to form an imide.

Such acid anhydrides include succinic anhydride, maleic anhydride, and other saturated or unsaturated aliphatic dicarboxylic anhydrides, tetrahydrophthalic anhydride, hexahydrophthalic anhydride (1,2-cyclohexanedicarboxylic anhydride), 1,2,3,4-cyclohexanetetracarboxylic 1,2-dianhydride, and other saturated or unsaturated non-aromatic cyclic polycarboxylic anhydrides (alicyclic polycarboxylic anhydrides), HET anhydride (chlorendic anhydride), himic anhydride, and other bridged cyclic polycarboxylic anhydride (alicyclic polycarboxylic anhydrides), phthalic anhydride, tetrabromophthalic anhydride, tetrachlorophthalic anhydride nitrophthalic anhydride, trimellitic anhydride, methylcyclohexenetricarboxylic anhydride, pyromellitic anhydride, mellitic anhydride, 1,8;4,5-naphthalenetetracarboxylic dianhydride, and other aromatic polycarboxylic anhydrides.

Typically preferred imide compounds include N-hydroxyimide compounds derived from alicyclic polycarboxylic anhydrides or aromatic polycarboxylic anhydrides, of which N-hydroxyphthalimide and other N-hydroxyimide compounds derived from aromatic polycarboxylic anhydrides are especially preferred.

Each of the imide compounds of the formula (1) can be used alone or in combination. The imide compounds can be used as being supported by carriers. As such carriers, activated carbon, zeolite, silica, silica-alumina, bentonite, and other porous carries are often employed.

The amount of the imide compound can be selected within a wide range, and is, for example, from about 0.0001 to 1 mole, preferably from about 0.001 to 0.5 mole, and more preferably from about 0.01 to 0.4 mole relative to 1 mole of the substrate. The imide compound is generally used in an amount ranging from about 0.05 to 0.35 mole relative to 1 mole of the substrate.

[Promoter (Co-catalyst)]

In the inventive process, a promoter (co-catalyst) can be used in combination with the catalyst of the formula (1) to improve or enhance the rate and selectivity of the reaction. Such promoters include, but are not limited to, (i) compounds each having a carbonyl group combined with an electron attractive group, (ii) metallic compounds, and (iii) organic salts each composed of a polyatomic cation or a polyatomic anion and its counter ion, which polyatomic cation or anion contains a Group 15 or Group 16 element of the Periodic Table of Elements having at least one organic group bonded thereto. Each of these promoters can be used alone or in combination.

In the compounds (i) each having a carbonyl group combined with an electron attractive group, the electron attractive group includes, but is not limited to, fluoromethyl, trifluoromethyl, tetrafluoroethyl, phenyl, fluorophenyl, pentafluorophenyl, and other hydrocarbon groups each substituted with a fluorine atom. As practical examples of the compounds (i), there may be mentioned hexafluoroacetone, trifluoroacetic acid, pentafluorophenyl methyl ketone, pentafluorophenyl trifluoromethyl ketone, and benzoic acid. The proportion of the compound (i) falls in the range from about 0.0001 to 1 mole, preferably from about 0.01 to 0.7 mole, and more preferably from about 0.05 to 0.5 mole relative to 1 mole of the substrate.

Metallic elements for constituting the metallic compounds (ii) are not limited and can be any of metallic elements of the Groups 1 to 15 of the Periodic Table of Elements. The term "metallic element" as used herein also includes boron, B. Examples of the metallic elements include, of the Periodic Table of Elements, Group 1 elements (e.g., Li, Na, K), Group 2 elements (e.g., Mg, Ca, Sr, Ba), Groups 3 elements (e.g., Sc, lanthanoid elements, actinoid elements), Group 4 elements (e.g., Ti, Zr, Hf), Group 5 elements (e.g., V), Group 6 elements (e.g., Cr, Mo, W), Group 7 elements (e.g., Mn), Group 8 elements (e.g., Fe, Ru), Group 9 elements (e.g., Co, Rh), Group 10 elements (e.g., Ni, Pd, Pt), Group 11 elements (e.g., Cu), Group 12 elements (e.g., Zn), Groups 13 elements (e.g., B, Al, In), Group 14 elements (e.g., Sn, Pb), Group 15 elements (e.g., Sb, Bi) and the like. Preferred metallic elements include transition metal elements (elements of Groups 3 to 12 of the Periodic Table of Elements). Among them, elements of the Groups 5 to 11 of the Periodic Table of Elements are preferred, of which elements of Group 6, Group 7 and Group 9 are typically preferred. Especially, Mo, Co and Mn can be advantageously used. The valence of the metallic element is not particularly limited, and is about 0 to 6 in many cases.

The metallic compounds (ii) include, but are not limited to, elementary substances, hydroxides, oxides (including complex oxides), halides (fluorides, chlorides, bromides, and iodides), salts of oxoacids (e.g., nirates, sulfates, phosphates, borates, and carbonates), oxoacids, isopolyacids, heteropolyacids, and other inorganic compounds of the aforementioned metallic elements; salts of organic acids (e.g., salts of acetic acid, propionic acid, hydrocyanic acid, naphthenic acid, and stearic acid), complexes, and other organic compounds of the metallic elements. Ligands for constituting the complexes include OH (hydroxo), alkoxy groups (e.g., methoxy, ethoxy, propoxy, and butoxy groups), acyl groups (e.g., acetyl, and propionyl groups), alkoxycarbonyl groups (e.g., methoxycarbonyl, and ethoxycarbonyl groups), acetylacetonato, cyclopentadienyl group, halogen atoms (e.g., chlorine, and bromine atoms), CO, CN, oxygen atom, $H_2O$ (aquo), phosphines (triphenylphosphine and other triarylphosphines), and other phosphorus compounds, $NH_3$ (ammine), NO, $NO_2$ (nitro), $NO_3$ (nitrato), ethylenediamine, diethylenetriamine, pyridine, phenanthroline, and other nitrogen-containing compounds. Each of the metallic compounds (ii) can be used alone or in combination.

The proportion of the metallic compound (ii) is, for example, about 0.0001 to 0.7 mole, preferably about 0.001 to 0.5 mole, and more preferably about 0.0015 to 0.1 mole relative to 1 mole of the substrate. The metallic compound (ii) is often used in a proportion of about 0.0015 to 0.05 mole relative to 1 mole of the substrate.

In the organic salts (iii), the Group 15 elements of the Periodic Table of Elements include N, P, As, Sb, and Bi, and the Group 16 elements of the Periodic Table of Elements include, for example, O, S, Se and Te. Preferred elements are N, P, As, Sb, and S, of which N, P, and S are typically preferred.

The organic groups to be bonded to atoms of the elements include, but are not limited to, hydrocarbon groups which may have a substituent, and substituted oxy groups. The hydrocarbon groups include, but are not limited to, methyl, ethyl, propyl, isopropyl, butyl, isobutyl, s-butyl, t-butyl, pentyl, hexyl, octyl, decyl, tetradecyl, hexadecyl, octadecyl, allyl, and other straight- or branched-chain aliphatic hydrocarbon groups (alkyl groups, alkenyl groups and alkynyl groups) each having about 1 to 30 carbon atoms (preferably about 1 to 20 carbon atoms); cyclopentyl, cyclohexyl, and other alicyclic hydrocarbon groups each having about 3 to 8 carbon atoms; and phenyl, naphthyl, and other aromatic hydrocarbon groups each having about 6 to 14 carbon atoms. Substituents which the hydrocarbon groups may have include, but are not limited to, a halogen atom, an oxo group, a hydroxyl group, a substituted oxy group (e.g., an alkoxy group, an aryloxy group, an acyloxy group), a carboxyl group, a substituted oxycarbonyl group, a substituted or unsubstituted carbamoyl group, a cyano group, a nitro group, a substituted or unsubstituted amino group, an alkyl group (e.g., methyl, ethyl, and other $C_1$–$C_4$ alkyl groups), a cycloalkyl group, an aryl group (e.g., phenyl, or naphthyl group), and a heterocyclic group. The preferred hydrocarbon groups include, for example, alkyl groups each having about 1 to 30 carbon atoms, and aromatic hydrocarbon groups (especially, phenyl or naphthyl group) each having about 6 to 14 carbon atoms. The substituted oxy groups include, but are not limited to, alkoxy groups, aryloxy groups and aralkyloxy groups.

The polyatomic cation is, for example, represented by the following formula (2). This polyatomic cation constitutes, with a counter anion, an organic onium salt represented by the following formula (3).

$$[R^a{}_m M]^+ Y^- \quad (3)$$

In the above formulae, $R^a$ is a hydrocarbon group or a hydrogen atom. The m $R^a$s may be identical to or different from each other, and at least one $R^a$ is a hydrocarbon group. M is an atom of Group 15 or Group 16 element of the Periodic Table of Elements. Two $R^a$s may be combined to form a ring with the adjacent M, or two $R^a$s may together form a double bond as one with M and be concurrently combined with another $R^a$ to form a ring with M. The numeral m denotes 3 or 4. $Y^-$ is a counter anion, and Y is an acid radical. The above hydrocarbon group may have, for example, any of the aforementioned substituents.

The rings which are to be formed by two $R^a$s with the adjacent M include, but are not limited to, pyrrolidine ring, piperidine ring, and other nitrogen-containing or phosphorus-containing heterocyclic rings each having about 3 to 8 members (preferably 5 or 6 members). Alternately, two $R^a$s may together form a double bond as one with M and be combined with another $R^a$ to form a ring with M. Such rings just mentioned above include pyridine ring, and other 5- to 8-membered nitrogen-containing heterocyclic rings. To these rings, a benzene ring or another ring may be condensed. Such a condensed ring includes, for example, quinoline ring. In many cases, m is 4 when M is an atom of Group 15 element of the Periodic Table of Elements, and, m is 3 when M is an atom of Group 16 element of the Periodic Table of Elements.

The atom M is preferably N, P, As, Sb or S, more preferably N, P or S, and particularly N or P. In the preferred polyatomic cations, all them $R^a$s are organic groups (including cases where a ring containing M is formed).

The acid radical Y includes, but is not limited to, fluorine, chlorine, bromine, iodine, and other halogen atoms; nitrate radical ($NO_3$), sulfate radical ($SO_4$), phosphate radical ($PO_4$), perchlorate radical ($ClO_4$), and other inorganic acid radicals; acetate radical ($CH_3CO_2$), methanesulfonate radical, benzenesulfonate radical, and other organic acid radicals. Preferred acid radicals include halogen atoms and inorganic acid radicals, of which chlorine atom, bromine atom and other halogen atoms are typically desirable.

Of the organic onium salts, organic ammonium salts, organic phosphonium salts, and organic sulfonium salts are typically preferred. Concrete examples of organic ammonium salts include tetramethylammonium chloride, tetraethylammonium chloride, tetrabutylammonium chloride, tetrahexylammonium chloride, trioctylmethylammonium chloride, triethylphenylammonium chloride, tributyl(hexadecyl)ammonium chloride, di(octadecyl)dimethylammonium chloride, and other quaternary ammonium chlorides, and corresponding quaternary ammonium bromides, and other quaternary ammonium salts each having four hydrocarbon groups bonded to its nitrogen atom; dimethylpiperidinium chloride, hexadecylpyridinium chloride, methyl quinolinium chloride, and other cyclic quaternary ammonium salts.

Practical examples of the organic phosphonium salts include tetramethylphosphonium chloride, tetrabutylphosphonium chloride, tributyl(hexadecyl)phosphonium chloride, triethylphenylphosphonium chloride, and other quaternary phosphonium chlorides, and corresponding quaternary phosphonium bromides, and other quaternary phosphonium salts each having four hydrocarbon groups bonded to its phosphorus atom. Concrete examples of the organic sulfonium salts include triethylsulfonium iodide, ethyldiphenylsulfonium iodide, and other sulfonium salts each having three hydrocarbon groups bonded to its sulfur atom.

The polyatomic anion is represented by, for example, the following formula (4). This polyatomic anion constitutes, with a counter cation, an organic salt of the following formula (5).

In the above formulae, $R^b$ is a hydrocarbon group or a hydrogen atom; M is an atom of Group 15 or Group 16 element of the Periodic Table of Elements; q denotes 1 or 2; and $Z^{q+}$ is a counter cation.

Such hydrocarbon groups represented by $R^b$ include, in addition to similar groups to the aforementioned hydrocarbon groups, resins (polymer chains or their branched chains). Preferred M includes, but is not limited to, S and P. The numeral q is 1 when M is S or the like, and it is 2 when M is P or the like. The atom M includes, but is not limited to, sodium, potassium, and other alkali metals; magnesium, calcium, and other alkaline earth metals, of which alkali metals are preferred. The counter cation $Z^{q+}$ may be the polyatomic cation as mentioned above.

Illustrative organic salts of the formula (5) include methanesulfonates, ethanesulfonates, octanesulfonates, dodecanesulfonates, and other alkyl-sulfonates; benzenesulfonates, p-toluenesulfonates, naphthalenesulfonates, decylbenzenesulfonates, dodecylbenzenesulfonates, and other aryl-sulfonates which may be substituted with an alkyl group; sulfonic acid type ion exchange resins (ion exchangers); and phosphonic acid type ion exchange resins (ion exchangers). Of these salts, a $C_6$–$C_{18}$ alkyl-sulfonate, or a $C_6$–$C_{18}$ alkyl-aryl sulfonate is often used.

The amount of the organic salt (iii) falls in the range, for example, from about 0.0001 to 0.7 mole, preferably from about 0.001 to 0.5 mole, more preferably from about 0.002 to 0.1 mole, and frequently from about 0.005 to 0.05 mole relative to 1 mole of the substrate. The use of the organic salt (iii) in excess amounts may reduce the reaction rate.

[Oxygen]

The oxygen for use in the invented process may be either molecular oxygen or nascent oxygen (active oxygen). The molecular oxygen includes, but is not limited to, pure oxygen, and oxygen diluted with an inert gas such as nitrogen, helium, argon, or carbon dioxide. Air is preferably used as the oxygen from the viewpoints of operating property and safety, as well as cost efficiency.

The amount of the oxygen can be chosen within an appropriate range depending on the species of the substrate, and is generally equal to or more than about 0.5 mole (e.g., equal to or more than 1 mole), preferably about 1 to 100 moles, and more preferably about 2 to 50 moles relative to 1 mole of the substrate. Excess moles of the oxygen relative to the substrate is used in many cases.

[Reaction]

The reaction is usually performed in an organic solvent. Such organic solvents include, but are not limited to, acetic acid, propionic acid, and other organic acids; acetonitrile, propiononitrile, benzonitrile, and other nitriles; formamide, acetamide, dimethylformamide (DMF), dimethylacetamide, and other amides; hexane, octane, and other aliphatic hydrocarbons; chloroform, dichloromethane, dichloroethane, carbon tetrachloride, chlorobenzene, trifluoromethylbenzene, and other halogenated hydrocarbons; nitrobenzene, nitromethane, nitroethane, and other nitro compounds; ethyl acetate, butyl acetate, and other esters; and mixtures of these solvents. As the solvent, acetic acid or another organic acid, acetonitrile, benzonitrile, or another nitrile, trifluoromethylbenzene, or another halogenated hydrocarbon, ethyl acetate or another ester is generally used.

The concentration of the substrate usually falls in the range from about 0.1 to 10 mol/l, preferably from about 0.5 to 5 mol/l, and more preferably from about O.7 to 3 mol/l. When the concentration of the substrate is excessively high, the selectivity for hydrogen peroxide may be deteriorated. In contrast, when it is excessively low, the process may become economically disadvantageous.

The reaction temperature can be appropriately selected depending on, for example, the species of the substrate, and is, for example, about 0° C. to 300° C., preferably about 20° C. to 200° C., and more preferably about 30° C. to 150° C. The reaction is generally performed at a temperature ranging from about 40° C. to 100° C. The reaction can be carried out at atmospheric pressure or under pressure. When the reaction is conducted under pressure, the pressure is usually about 1 to 100 atm (e.g. 1.5 to 80 atm), preferably about 2 to 70 atm. The reaction time can be appropriately selected within the range of, for example, about 30 minutes to 48 hours, preferably about 5 to 35 hours, and more preferably about 10 to 30 hours, according to the reaction temperature and pressure. The reaction can be performed in a batch system, a semi-batch system, a continuous system or another conventional system, in the presence of, or under flow of, oxygen.

According to the invented process, the reaction yields, in addition to hydrogen peroxide, an aldehyde (when the substrate is a primary alcohol) or a ketone (when the substrate is a secondary alcohol) corresponding to the type of the substrate.

After the completion of the reaction, reaction products (hydrogen peroxide and an aldehyde or a ketone) can be easily separated and purified in a conventional manner. Such a conventional manner includes, for example, filtration, concentration, distillation, extraction, crystallization, recrystallization, column chromatography and other separation means, or any combination of these separation means. The formed hydrogen peroxide can be used as, for example, an oxidizing agent without isolation. The formed aldehyde or ketone can be employed for its own use, alternately it can be recycled as the substrate by converting into a primary or secondary alcohol according to a conventional reduction process.

According to the invented process, hydrogen peroxide can be easily and efficiently obtained from readily available materials.

The present invention will now be illustrated in more detail with reference to several inventive examples below, which are not intended limiting the scope of the invention. In the examples, a quantitative analysis of hydrogen peroxide was conducted as follows. To 1 part by weight of the reaction mixture was added 5 parts by weight of water and 2 parts by weight of ethylbenzene to extract, and the water layer was analyzed by an iodometry.

EXAMPLE 1

A mixture of 5 mmol of benzhydrol, 0.5 mmol of N-hydroxyphthalimide, and 5 ml of acetonitrile was stirred at 75° C. in an oxygen atmosphere (1 atm) for 18 hours. An iodometric analysis of a reaction mixture revealed that hydrogen peroxide was formed in yield of 42% (selectivity: 87%). Separately, as a result of a gas chromatographic analysis of the reaction mixture, the conversion rate from benzhydrol was 48%, and benzophenone was formed in yield of 48%.

EXAMPLE 2

The procedure of Example 1 was repeated, except that the reaction time was set at 24 hours. As a result, benzhydrol was converted, at a rate of 77%, into hydrogen peroxide in yield of 55% (selectivity: 71%) and benzophenone in yield of 76%.

EXAMPLE 3

A mixture of 5 mmol of benzhydrol, 0.5 mmol of N-hydroxyphthalimide, and 5 ml of acetonitrile was stirred at 75° C. in an air atmosphere (1 atm) for 24 hours. An iodometric analysis of a reaction mixture revealed that hydrogen peroxide was formed in yield of 41% (selectivity: 76%). Separately, a gas chromatographic analysis of the reaction mixture revealed that the conversion rate from benzhydrol was 54%, and benzophenone was formed in yield of 52%.

EXAMPLE 4

A mixture of 5 mmol of benzhydrol, 0.5 mmol of N-hydroxyphthalimide, 0.0005 mmol of cobalt(II) acetate, and 5 ml of acetonitrile was stirred at 50° C. in an air atmosphere (1 atm) for 24 hours. An iodometric analysis of a reaction mixture revealed that hydrogen peroxide was formed in yield of 16% (selectivity: 89%). Separately, a gas chromatographic analysis of the reaction mixture revealed that the conversion rate from benzhydrol was 18%, and benzophenone was formed in yield of 18%.

EXAMPLE 5

A mixture of 5 mmol of 1-phenylethanol, 0.5 mmol of N-hydroxyphthalimide, and 5 ml of acetonitrile was stirred at 75° C. in an oxygen atmosphere (1 atm) for 24 hours. An iodometric analysis of a reaction mixture revealed that hydrogen peroxide was formed in yield of 32% (selectivity: 84%). Separately, a gas chromatographic analysis of the reaction mixture revealed that the conversion rate from 1-phenylethanol was 38%, and acetophenone was formed in yield of 36%.

EXAMPLE 6

A mixture of 5 mmol of cyclohexanol, 0.5 mmol of N-hydroxyphthalimide, and 5 ml of acetonitrile was stirred at 75° C. in an oxygen atmosphere (1 atm) for 15 hours. An iodometric analysis of a reaction mixture revealed that hydrogen peroxide was formed in yield of 12% (selectivity: 71%). Separately, a gas chromatographic analysis of the reaction mixture revealed that the conversion rate from cyclohexanol was 17%, and cyclohexanone was formed in yield of 17%.

EXAMPLE 7

A mixture of 5 mmol of 2-octanol, 0.5 mmol of N-hydroxyphthalimide, 0.0005 mmol of cobalt(II) acetate, and 5 ml of acetonitrile was stirred at 75° C. in an oxygen atmosphere (1 atm) for 24 hours. An iodometric analysis of a reaction mixture revealed that hydrogen peroxide was formed in yield of 21% (selectivity: 35%). Separately, a gas chromatographic analysis of the reaction mixture revealed that the conversion rate from 2-octanol was 60%, and 2-octanone was formed in yield of 53%.

EXAMPLE 8

A mixture of 5 mmol of 9,10-dihydroanthracene-9,10-diol, 0.5 mmol of N-hydroxyphthalimide, and 5 ml of ethyl acetate was stirred at 75° C. in an oxygen atmosphere (1 atm) for 18 hours. An iodometric analysis of a reaction mixture revealed that hydrogen peroxide was formed in yield of 36%. Separately, as a result of a gas chromatographic analysis of the reaction mixture, the conversion rate from 9,10-dihydroanthracene-9,10-diol was 27%, and anthraquinone was formed in yield of 24%.

EXAMPLE 9

A mixture of 5 mmol of benzhydrol, 0.5 mmol of N-hydroxyphthalimide, and 5 ml of ethyl acetate was stirred at 75° C. in an oxygen atmosphere (1 atm) for 12 hours. An iodometric analysis of a reaction mixture revealed that hydrogen peroxide was formed in yield of 50% (selectivity: 70%). Separately, as a result of a gas chromatographic analysis of the reaction mixture, the conversion rate from benzhydrol was 72%, and benzophenone was formed in yield of 71%.

EXAMPLE 10

A mixture of 5 mmol of 1-phenylethanol, 0.5 mmol of N-hydroxyphthalimide, and 5 ml of ethyl acetate was stirred at 75° C. in an oxygen atmosphere (1 atm) for 18 hours. An iodometric analysis of a reaction mixture revealed that hydrogen peroxide was formed in yield of 40% (selectivity: 81%). Separately, a gas chromatographic analysis of the reaction mixture revealed that the conversion rate from 1-phenylethanol was 49%, and acetophenone was formed in yield of 48%.

EXAMPLE 11

A mixture of 5 mmol of cyclohexanol, 0.5 mmol of N-hydroxyphthalimide, and 5 ml of ethyl acetate was stirred at 75° C. in an oxygen atmosphere (1 atm) for 20 hours. An iodometric analysis of a reaction mixture revealed that hydrogen peroxide was formed in yield of 14% (selectivity: 70%). Separately, a gas chromatographic analysis of the reaction mixture revealed that the conversion rate from cyclohexanol was 20%, and cyclohexanone was formed in yield of 19%.

EXAMPLE 12

A mixture of 40 mmol of benzhydrol, 4 mmol of N-hydroxyphthalimide, and 20 ml of ethyl acetate was stirred at 75° C. in an oxygen atmosphere (1 atm) for 12 hours. An iodometric analysis of a reaction mixture revealed that hydrogen peroxide was formed in yield of 60% (selectivity: 85%). Separately, as a result of a gas chromatographic analysis of the reaction mixture, the conversion rate from benzhydrol was 71%, and benzophenone was formed in yield of 70%.

EXAMPLE 13

A mixture of 5 mmol of benzhydrol, 0.5 mmol of N-hydroxyphthalimide, and 5 ml of ethyl acetate was stirred at 75° C. in an air atmosphere (10 atm) for 12 hours. An iodometric analysis of a reaction mixture revealed that hydrogen peroxide was formed in yield of 57% (selectivity: 76%). Separately, as a result of a gas chromatographic analysis of the reaction mixture, the conversion rate from benzhydrol was 75%, and benzophenone was formed in yield of 75%.

EXAMPLE 14

A mixture of 5 mmol of 1-phenylethanol, 0.5 mmol of N-hydroxyphthalimide, and 5 ml of ethyl acetate was stirred at 75° C. in an air atmosphere (5 atm) for 24 hours. An iodometric analysis of a reaction mixture revealed that hydrogen peroxide was formed in yield of 35% (selectivity: 86%). Separately, a gas chromatographic analysis of the reaction mixture revealed that the conversion rate from 1-phenylethanol was 40%, and acetophenone was formed in yield of 40%.

What is claimed is:

1. A process for producing hydrogen peroxide, said process comprising the step of reacting a primary or secondary alcohol with oxygen in the presence of an imide compound of the following formula (1):

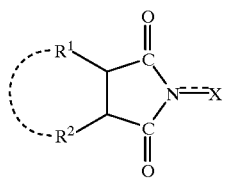 (1)

wherein each of $R^1$ and $R^2$ is, identical to or different from each other, a hydrogen atom, a halogen atom, an alkyl group, an aryl group, a cycloalkyl group, a hydroxyl group, an alkoxy group, a carboxyl group, an alkoxycarbonyl group, or an acyl group, where $R^1$ and $R^2$ may be combined to form a double bond, or an aromatic or non-aromatic ring; X is an oxygen atom or a hydroxyl group, where one or two N-substituted cyclic imido groups indicated in the formula (1) may be further bonded to the aforementioned $R^1$, $R^2$, or to the double bond or aromatic or non-aromatic ring formed together by $R^1$ and $R^2$, to yield hydrogen peroxide.

2. A process for producing hydrogen peroxide according to claim 1, wherein the imide compound of the formula (1) is used in an amount ranging from 0.0001 to 1 mole relative to mole of the primary or secondary alcohol.

3. A process for producing hydrogen peroxide according to claim 1, wherein the reaction is performed at a temperature ranging from 20° C. to 200° C.

* * * * *